(12) United States Patent
Teng et al.

(10) Patent No.: US 11,725,157 B2
(45) Date of Patent: Aug. 15, 2023

(54) SYSTEMS AND METHODS FOR CONVERSION OF UNSORTED SOLID WASTES

(71) Applicant: Wai Mun Teng, Markham (CA)

(72) Inventors: Wai Mun Teng, Markham (CA); Sebastian Cogswell, Vancouver (CA); Song Jin, Fort Collins, CO (US); Paul Fallgren, Fort Collins, CO (US)

(73) Assignee: Wai Mun Teng, Ontario, CA (US)

( * ) Notice: Subject to any disclaimer, the term of this patent is extended or adjusted under 35 U.S.C. 154(b) by 0 days.

(21) Appl. No.: 17/639,526

(22) PCT Filed: Sep. 9, 2020

(86) PCT No.: PCT/IB2020/000720
§ 371 (c)(1),
(2) Date: Mar. 1, 2022

(87) PCT Pub. No.: WO2021/048614
PCT Pub. Date: Mar. 18, 2021

(65) Prior Publication Data
US 2022/0315855 A1    Oct. 6, 2022

Related U.S. Application Data

(60) Provisional application No. 62/897,739, filed on Sep. 9, 2019.

(51) Int. Cl.
*B09B 3/35* (2022.01)
*B09B 3/40* (2022.01)
(Continued)

(52) U.S. Cl.
CPC ............... *C10L 9/086* (2013.01); *B03B 9/06* (2013.01); *B09B 3/35* (2022.01); *B09B 3/40* (2022.01);
(Continued)

(58) Field of Classification Search
CPC ... C10L 9/086; C10L 5/46; B09B 3/35; B09B 3/40; B09B 3/70
See application file for complete search history.

(56) References Cited

U.S. PATENT DOCUMENTS 4,342,830 A    8/1982 Holloway
4,624,417 A *  11/1986 Gangi ....................... C10L 5/46
                                                    241/23

(Continued)

FOREIGN PATENT DOCUMENTS

CN    101007955 A    8/2007
CN    102327888      1/2012
(Continued)

OTHER PUBLICATIONS

Counterpart Canadian Patent Application No. 3143312, Office Action issued by the Canadian Patent Office dated Mar. 23, 2022. 6 pages.
(Continued)

*Primary Examiner* — Ellen M McAvoy
*Assistant Examiner* — Ming Cheung Po
(74) *Attorney, Agent, or Firm* — Santangelo Law Offices, P.C.

(57) ABSTRACT

Embodiments of the present invention may provide managing waste including providing non-sorted solid waste (1), processing non-sorted solid waste in a waste handling system (21), shredding (26) non-sorted solid waste to create shredded non-sorted solid waste (27) in a waste handling system; introducing shredded non-sorted solid waste into a thermochemical conversion reactor (4); heating and even chemically converting a shredded non-sorted solid waste; producing hydrochar (22) and a recyclable materials fraction (23); recycling water (24) used in the heating and chemically processing of the shredded non-sorted solid waste in a thermochemical conversion reactor in said waste handling system; sorting (25) the recyclable materials fraction; fuel-
(Continued)

ing (28) a thermochemical conversion reactor with hydrochar (22); and perhaps even recycling heat from a thermochemical conversion reactor in the waste handling system.

20 Claims, 3 Drawing Sheets

(51) Int. Cl.

| | | |
|---|---|---|
| *B09B 3/70* | (2022.01) | |
| *C10L 9/08* | (2006.01) | |
| *B03B 9/06* | (2006.01) | |
| *C10L 5/44* | (2006.01) | |
| *C10L 5/46* | (2006.01) | |
| *B09B 101/25* | (2022.01) | |

(52) U.S. Cl.
CPC .............. *B09B 3/70* (2022.01); *C10L 5/447* (2013.01); *C10L 5/46* (2013.01); *B09B 2101/25* (2022.01); *C10L 2290/06* (2013.01); *C10L 2290/10* (2013.01); *C10L 2290/28* (2013.01)

(56) References Cited

U.S. PATENT DOCUMENTS

| | | | | |
|---|---|---|---|---|
| 5,104,490 | A * | 4/1992 | Brinkman | C10B 1/04 |
| | | | | 202/215 |
| 5,556,445 | A | 9/1996 | Quinn et al. | |
| 6,024,226 | A * | 2/2000 | Olivier | B03B 5/42 |
| | | | | 209/172.5 |
| 6,202,577 | B1 * | 3/2001 | Boguslavsky | F23G 5/006 |
| | | | | 110/220 |
| 10,392,566 | B2 | 8/2019 | Linck | |
| 2006/0280669 | A1 * | 12/2006 | Jones | C10B 53/02 |
| | | | | 202/136 |
| 2013/0295628 | A1 | 11/2013 | Retsina et al. | |
| 2014/0223908 | A1 * | 8/2014 | Sweeney | F01K 23/067 |
| | | | | 48/89 |
| 2017/0051221 | A1 * | 2/2017 | Park | C10L 9/086 |
| 2019/0177192 | A1 | 6/2019 | Valentas et al. | |

FOREIGN PATENT DOCUMENTS

| | | |
|---|---|---|
| CN | 103722002 A | 4/2014 |
| CN | 105602588 | 5/2016 |
| CN | 106574188 A | 4/2017 |
| CN | 110142281 | 8/2019 |
| WO | 2021048614 A1 | 3/2021 |

OTHER PUBLICATIONS

Iniguez, et al., Hydrothermal carbonization (HTC) of marine plastic debris. Fuel 257 (2019) 116033. https://doi.org/10.1016/j.fuel.2019.116033 Aug. 15, 2019. 8 pages.

Vlaskin, M.S., Hydrothermal carbonization of organic components from municipal solid waste. Theoretical Foundations of Chemical Engineering, 2018, vol. 52, No. 6, pp. 996-1003. © Pleiades Publishing, Ltd., 2018.

Shen, Yafei, A review on hydrothermal carbonization of biomass and plastic wastes to energy products. Biomass and Bioenergy, vol. 134, Mar. 2020, 105479. 2 pages.

U.S. Appl. No. 62/897,739, filed Sep. 9, 2019. First Named Inventor: Teng, Wai Mun.

International PCT Patent Application No. PCT/IB2020/00720, filed Sep. 9, 2020. International Search Report dated Jan. 15, 2021. 5 pages.

International PCT Patent Application No. PCT/IB2020/00720, filed Sep. 9, 2020. Written Opinion of the International Searching Authority dated Jan. 22, 2021. 4 pages.

Counterpart Canadian Patent Application No. 3143312. Commissioner's Notice—Application Found Allowanble dated Mar. 13, 2023. 1 page.

* cited by examiner

SYSTEMS AND METHODS FOR CONVERSION OF UNSORTED SOLID WASTES

PRIORITY CLAIM

This application is the United States National Phase of PCT International Patent Application No. PCT/IB2020/000720, filed Sep. 9, 2020, which claims priority to and the benefit of U.S. Provisional Application No. 62/897,739 filed Sep. 9, 2019, both said applications are hereby incorporated by reference herein in their entirety.

TECHNICAL FIELD

Aspects of the invention may relate to the sorting, conversion, and even recovery of recyclable materials from unsorted solid waste such as domestic garbage, municipal solid waste, and the like. More specifically, embodiments of the present invention may relate to the utilization of thermochemical conversion of non-recyclable organic fraction of unsorted solid waste perhaps into hydrochar and perhaps size or density separation of recyclable materials fraction from the hydrochar or the like.

BACKGROUND

Solid waste streams from households to businesses may primarily consist of unsorted mixtures of waste materials that end up in the landfill as municipal solid waste, where substantial fractions of the waste mixtures may consist of recyclable materials. Separation of such recyclable materials may be difficult due to being mixed with high fractions of non-recyclable organic wastes, such as food waste, paper, wet organic waste, and the like. Often these organic fractions can be wet and even contaminated with pathogenic microorganisms which can increase the difficulties and risks of separation. Most methods for recyclables separation are resource-intensive; that is, past separation methods may require substantial amounts of resources that may include water and human labor—leading to high costs for recycling materials from unsorted solid waste streams and may not be economical.

Thermochemical processes such as pyrolysis, combustion, gasification, hydrothermal carbonization ("HTC"), and the like can convert organic materials into solid carbonaceous materials typically referred to as hydrochar but may also be referred to as biochar. Hydrochar may be a carbon-rich solid by-product as a result of thermochemical processes such as with carbon containing materials. Thermochemical process can convert organic wastes such as food wastes, biomass, paper, other organic wet wastes, and the like using temperatures that do not significantly change recyclable materials that include plastics and metals but that may kill pathogens and other microorganisms. Since the hydrochar products are dry granular or even powdered materials, easier separation of untransformed recyclable materials from the thermal catalytic processing of unsorted solid waste streams can be achieved.

Embodiments of the present invention may provide thermochemical-based systems or methods to convert non-recyclable organic fractions of unsorted solid waste streams into hydrochar and perhaps even separate and recover non-converted recyclable materials from the hydrochar.

DISCLOSURE OF INVENTIONS

The present invention includes a variety of aspects, which may be selected in different combinations based upon the particular application or needs to be addressed. In various embodiments, the invention may include managing waste using thermochemical processes.

It is an aspect of some embodiments of the present invention to provide a thermochemical method and process that may enhance the separation and recovery of recyclable materials from unsorted solid waste streams.

It is an aspect of some embodiments of the present invention to provide a method and process that may enhance the separation and recovery of recyclable materials by thermochemical conversion of the non-recyclable organic fraction of unsorted solid waste streams into hydrochar.

It is yet another aspect of some embodiments of the present invention to provide a method and process that can separate recyclable materials from hydrochar perhaps by size.

It is an aspect of some embodiments of the present invention to provide a method and process that can separate recyclable materials from hydrochar perhaps by density.

It is an aspect of some embodiments of the present invention to provide a method and process that can separate metallic recyclable materials from hydrochar perhaps by magnetics or electromagnetics, or the like.

It is an aspect of some embodiments of the present invention to provide a method and process that can separate metallic recyclable materials from non-metallic recyclable materials by magnetics, electromagnetics, or the like.

It is an aspect of some embodiments of the present invention to provide a method and process that can separate plastics materials from the recyclable materials perhaps by density.

It is an aspect of some embodiments of the present invention to provide a method and process which may utilize a plastic fraction as an improved refuse derived fuel (RDF) for power generator, heat, or the like.

It is yet another an aspect of some embodiments of the present invention to provide a method and process that can utilize heat from the combustion of the hydrochar or even recovered plastic (RDF) perhaps produced by the method and process.

It is an aspect of some embodiments of the present invention to provide a method and process that can utilize electrical heating from the power generation fueled by the hydrochar or even RDF perhaps produced by the method and process.

It is an aspect of some embodiments of the present invention to provide a method and process that can utilize water recovered from the dewatering of the solid waste perhaps for separating recyclables from the hydrochar.

Naturally, further objects, goals and embodiments of the inventions are disclosed throughout other areas of the specification, claims, and drawings.

MODE(S) FOR CARRYING OUT THE INVENTIONS

Figure 1:
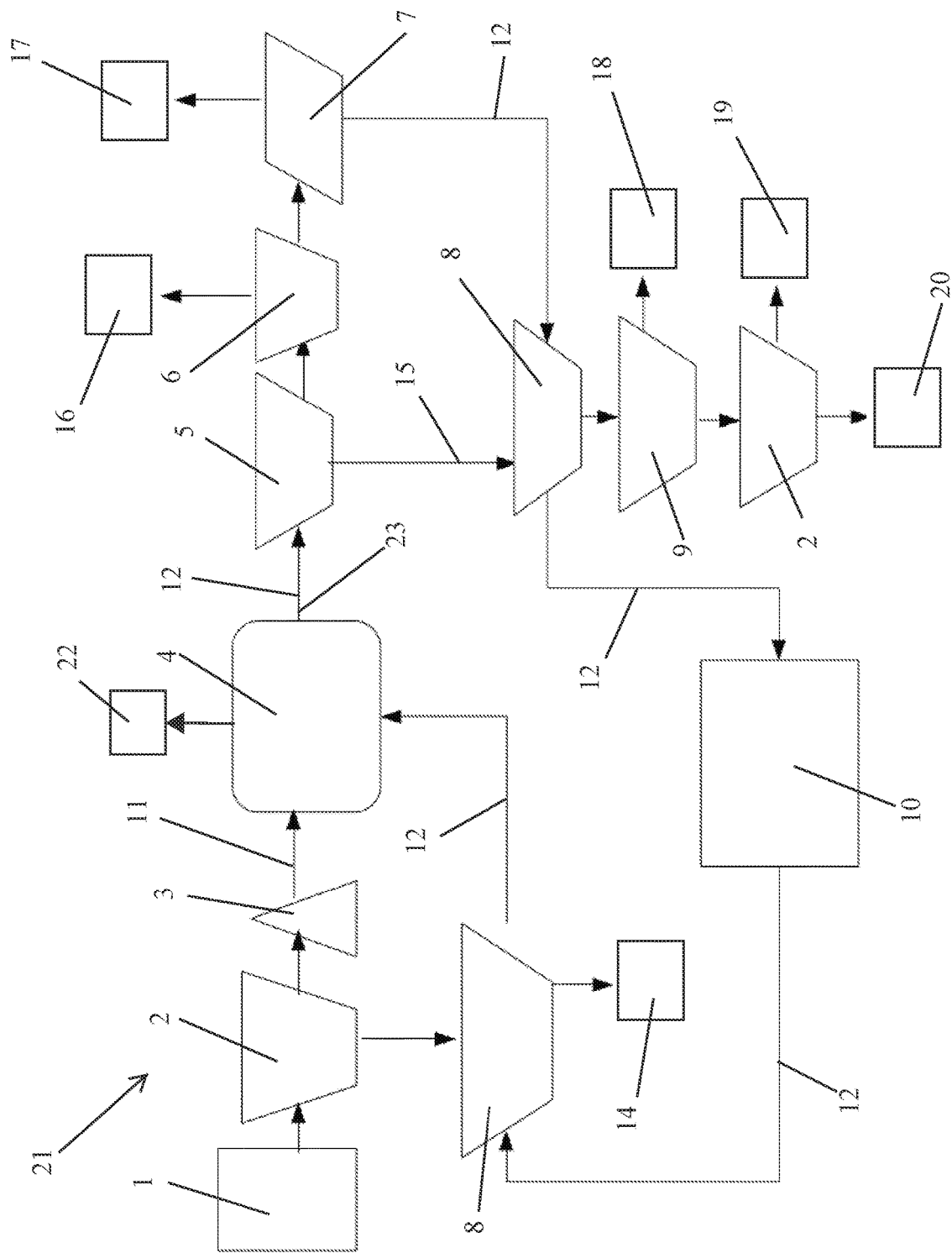
FIG. 1 shows a process diagram of a non-limiting example for a waste handling system having thermochemical processes that can separate recyclable materials from unsorted solid waste streams in accordance with some embodiments of the present invention.

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may provide systems and methods for managing waste comprising the steps of providing non-sorted solid waste; processing said non-sorted solid waste in a waste handling system; shredding said non-sorted solid waste to create shredded non-sorted solid waste in said waste handling system; introducing said shredded non-sorted solid waste into a thermochemical reactor of said waste handling system; heating and chemically converting said shredded non-sorted solid waste in said thermochemical reactor; producing hydrochar and a recyclable materials fraction from said step of heating and chemically converting of said shredded non-sorted solid waste in said thermochemical reactor; recycling water used in said heating and chemically processing of said shredded non-sorted solid waste in said thermochemical reactor in said waste handling system; sorting said recyclable materials fraction in said waste handling system; fueling said thermochemical reactor with said hydrochar in said waste handling system; and perhaps even recycling heat from said thermochemical reactor in said waste handling system.

The various processes and devices discussed herein can provide carbon enriched fuel, separation of recyclable materials and the like which may be easier and cleaner than existing techniques. Embodiments of the present invention may provide methods and processes for enhancing the separation and even recovery of recyclable materials from unsorted solid waste streams perhaps by the thermochemical conversion of the non-recyclable organic fraction into hydrochar, gas, or the like. Thermochemical processes may include, but is not limited to, hydrothermal carbonization (HTC), pyrolysis, torrefaction, gasification, and the like. An unsorted solid waste stream may include, but is not limited to, domestic garbage, industrial waste, municipal solid waste, wet wastes, and the like. Recyclable materials may include, but is not limited to, items composed of plastics, metals, glass, and the like. Unrecyclable organic materials may include, but is not limited to, food waste, agricultural waste, industrial organic byproducts, toxic organic wastes, biomass, paper, other wet organic wastes, and the like.

Embodiments of the present invention may provide methods and processes for separating recyclable materials from the thermochemically converted organic fraction of an unsorted solid waste stream. A separation method and process may include size separation, density separation, and the like. Metallic recyclable materials may be separated from the thermochemically organic fraction or even from the other non-metallic recyclable materials perhaps by the utilization of magnets or electromagnets or the like.

Embodiments of present invention may include thermochemically based methods and processes for sorting unsorted solid waste streams perhaps by using heat generated from the combustion of the converted non-recyclable organic fraction.

Embodiments of the present invention may include thermochemically based methods and processes for sorting unsorted solid waste streams perhaps by using electrical energy from power generation fueled by the converted non-recyclable organic fraction.

Embodiments of the present invention may include methods and processes for separating and even cleaning recyclable materials from the thermochemically converted non-recyclable organic fraction perhaps by using recycled water from the solid waste dewatering process.

FIG. 1 shows a process diagram of non-limiting examples for a thermochemically based system which can separate and recover recyclable materials from waste such as non-sorted solid waste (1) which may include domestic garbage, municipal solid waste, and the like. Embodiments of the present invention may provide a system and method including, but not limited to: separators (2) such as magnetic and eddy current separators; sizing equipment (3) such as shredders or even a grinder; a thermochemical conversion reactor (4); separation processes such as size based separation systems (5) like screens, or the like and even density based separation systems (6) such as a sand trap or the like; a dewatering process (7); a rinsing process (8); a plastic separation process (9); a process water storage (10); any combination or permutation thereof; or the like. A preprocessed non-sorted solid waste stream (11) may be fed to a thermochemical conversion reactor (4) perhaps to convert a non-recyclable organic fraction of the solid waste into hydrochar (22). A product stream (12) from a thermochemical conversion reactor (4) may be processed by separation processes (5), (6) perhaps to recover recyclable materials and even returning organic residue containing water to a thermochemical conversion reactor (4).

Figure 2:
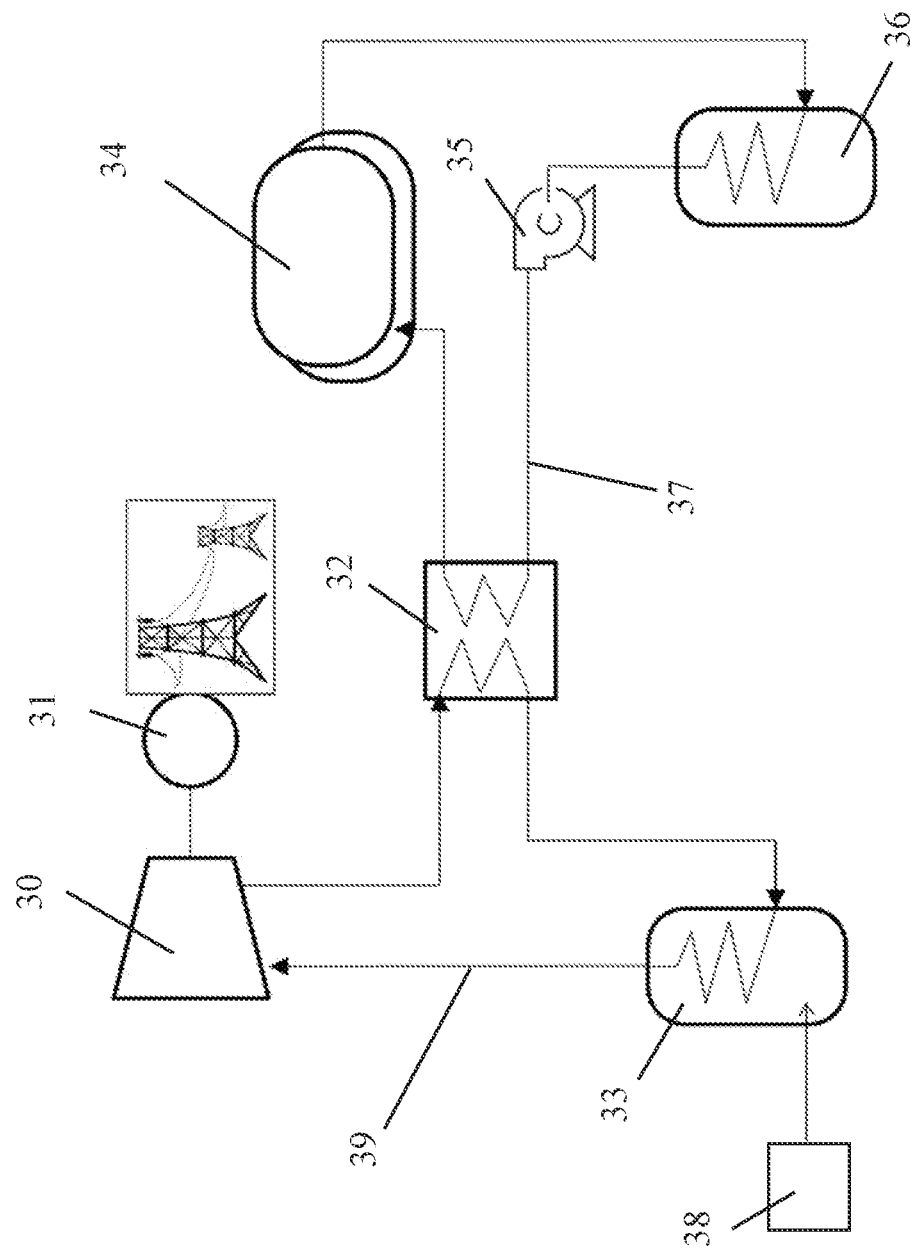
FIG. 2 shows a process diagram of a non-limiting example of heat recycling from hydrochar or even RDF powered electric generator which may be used to heat a treatment system in accordance with some embodiments of the present invention.

FIG. 2 is a process diagram for a non-limiting example of methods and systems of reusing excess heat from a power generation turbine to heat a thermochemical conversion reactor. A system may include, but is not limited to: a typical steam turbine (30); an electric generator (31); a heat exchanger to transfer the excess steam heat to thermal oil heat (32); a boiler (33) or combustion chamber fueled by hydrochar or even RDF; a jackets thermochemical conversion reactor or HTC reactor (34) using hot thermal oil to heat the material; a thermal oil circulation pump (35); a thermal oil heater (36); a steam pipeline (39) to run between the turbine and the boiler; a thermal oil pipeline (37) to supply the heat to the thermochemical conversion or HTC reactor; and perhaps even a hydrochar (38) or RDF from the thermochemical conversion or HTC reaction to supply the fuel to the steam boiler (33). Other non-limiting examples may use the heat in the combustion exhaust or even may directly use the steam from the turbine either in the thermochemical conversion reactor or HTC reactor jacket or even directly injected into the thermochemical conversion reactor or HTC reactor interior. The same can be used for supplying the required heat for other organic treatment methods such as pyrolysis or gasification and the like.

Figure 3:
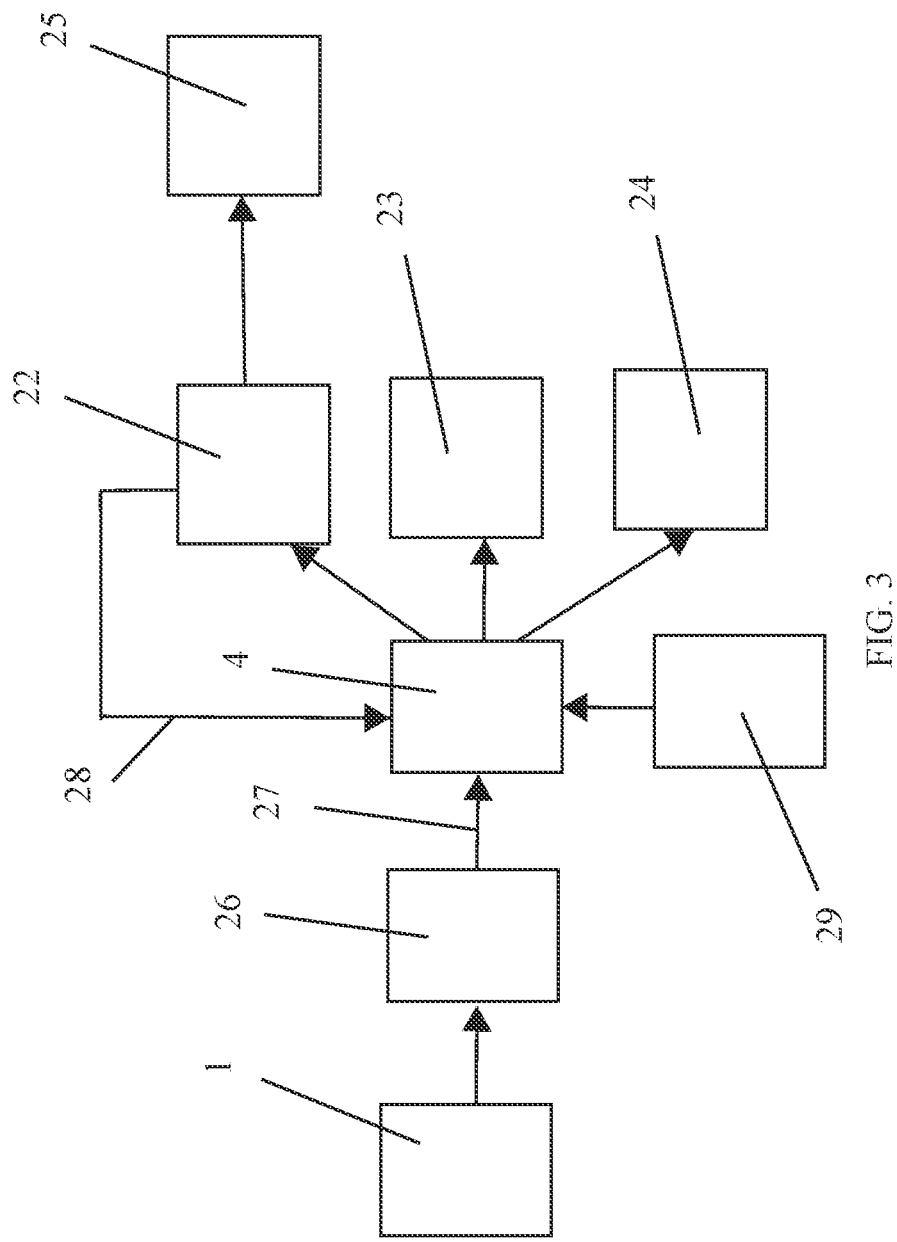
FIG. 3 shows a non-limiting example of a waste management system in accordance with some embodiments of the present invention.

Embodiments of the present invention may include providing a non-sorted solid waste (1) which may be processed in a waste handling system (21). Non-sorted solid waste may include but is not limited to waste from a landfill, domestic garbage, municipal solid waste and the like which as not been pre-sorted. Processing may include, but is not limited to treating or even preparing said waste in some particular series of actions. An example of processing may include shredding (26) non-sorted solid waste (1) to create shredded non-sorted solid waste (27) in said waste handling system as may be understood from FIG. 3. The shredded non-sorted solid waste (27) may be introduced into a thermochemical conversion reactor (4) of a waste handling system. In said thermochemical conversion reactor (4), heating and even chemically converting of the shredded non-sorted solid waste may occur to produce hydrochar (22), recyclable materials fraction (23), water (24) and the like. Water (24) may be recycled from the thermochemical conversion reactor (4). Such recyclable materials fraction (23) may be sorted (25) to such as but not limited to size sorting, density sorting, magnetics sorting, electromagnetics sorting, sorting recyclable materials from hydrochar, sorting metal recyclables form from non-metallic recyclables, perhaps with magnetics, electromagnets, or the like, separating plastics from the recyclable material perhaps by density, size or the like; and the like.

A thermochemical conversion reactor may be fueled (28) with hydrochar (22) produced in the thermochemical conversion reactor (4). Heat from the thermochemical conversion reactor may be recycled in the waste handling system (21). A recyclable materials fraction (23) may be sorted into a plastic fraction, a glass fraction, a metal fraction, a non-organics fraction, a sand fraction, and a solid carbon product, or the like. Plastics in a thermochemical conversion reactor may be converted into carbon, fuel, carbonized products, and the like. Depending on the type of plastic, carbon in plastics may be rearranged and may result in carbon, such as hydrochar. Residual, perhaps in a limited quantity may also result from a thermochemical conversion reactor.

A metal fraction from a recyclable materials fraction (23) may be sorted with a sorter including, but not limited to magnets, eddy current separation, magnetic separation, paramagnetic separation, and the like. Recyclable material fraction may be rinsed with water perhaps recycled from a thermochemical conversion reactor. A recyclable metals fraction may be dewatered to remove the water from the fraction. An existing power plant, perhaps even without any changes needed therein, may be fueled with hydrochar from a waste handling system. Hydrochar from a thermochemical conversion reactor may be just as good as coal perhaps without the ash.

Embodiments of the present invention may provide limited volatile organic and even limited carbon dioxide emissions from a waste handling system due to the efficient processes and methods as discussed therein.

Leachate water (29) or even garbage water may be introduced into a thermochemical conversion reactor (4) of a waste handling system. Leachate water or the like may be introduced with our without a solid waste or even shredded solid waste into a thermochemical conversion reactor which may remove odor, may change the carbon containing compounds in the water to simple carbon, may result in what looks like clear cooking oil and such result may be applied as irrigation water or the like. Leachate water (29) may be treated and even sterilized in a thermochemical conversion reactor. A thermochemical conversion reactor may remove chlorine from chlorine containing plastics in shredded non-sorted solid waste. Non-sorted solid waste may include materials chosen from, but not limited to plastics, polyvinyl chloride, chloride containing plastics, non-recyclable organic wastes, food waste, paper, wet organic waste, and any combination thereof, or the like.

In embodiments of the present invention, a recyclable material fraction may include non-converted recyclable materials fraction. A thermochemical conversion reactor may be a hydrothermal carbonization reactor or the like.

A test was done on landfill leachate, which may be a concentrated liquid containing high organic compounds that are hazardous. The test treatment may have produced a liquid of small organic acids that are bioavailable, and the liquid was used as nutrient-containing irrigation water.

Example 1

A novel twin 1-m$^3$ HTC-based system using proprietary catalysts may be used to process about 175 kg unsorted wet municipal solid waste. Large bags and furniture parts were removed from the conveyor before the remaining MSW was shredded to about 8 mm. The shredded waste was mixed with water to form a slurry and then treated by the HTC-based process. After cooling, the slurry was passed through a screen to remove larger fractions of unconverted recyclable material. Sand was then separated via density separation, and the converted material was dewatered. A separated unconverted recyclable material was further separated by washing, size exclusion (screening), and density separation. Metals were separated by magnetic and eddy currant separators. From the about 175 kg MSW, about 30 kg hydrochar, about 4 kg metal, about 18 kg RDF plastic, and about 2 kg glass/ceramics were recovered. The hydrochar had heat value of about >5000 kcal/kg.

Examples of alternative claims may include the following clauses:

1. A method for managing waste comprising the steps of:
   providing non-sorted solid waste;
   processing said non-sorted solid waste in a waste handling system;
   shredding said non-sorted solid waste to create shredded non-sorted solid waste in said waste handling system;
   introducing said shredded non-sorted solid waste into a thermochemical conversion reactor of said waste handling system;
   heating and chemically converting said shredded non-sorted solid waste in said thermochemical conversion reactor;
   producing hydrochar and a recyclable materials fraction from said step of heating and chemically converting of said shredded non-sorted solid waste in said thermochemical conversion reactor;
   recycling water used in said heating and chemically processing of said shredded non-sorted solid waste in said thermochemical conversion reactor in said waste handling system;
   sorting said recyclable materials fraction in said waste handling system;

fueling said thermochemical conversion reactor with said hydrochar in said waste handling system; and recycling heat from said thermochemical conversion reactor in said waste handling system.

2. The method as described in clause 1 or any other clause wherein said non-sorted solid waste comprises non-sorted solid waste from a landfill.

3. The method as described in clause 1 or any other clause wherein said non-sorted solid waste comprises domestic garbage and municipal solid waste.

4. The method as described in clause 1 or any other clause wherein said step of sorting said recyclable materials fraction in said waste handling system comprises the step of sorting a plastic fraction, a glass fraction, a metal fraction, a non-organics fraction, a sand fraction, and a solid carbon product fraction from said recyclable materials fraction.

5. The method as described in claim 1 or any other clause and further comprising the step of converting plastics in said thermochemical conversion reactor.

6. The method as described in clause 4 or any other clause wherein said metal fraction is sorted with a sorter chosen from magnets, eddy current separation, magnetic separation, and paramagnetic separation.

7. The method as described in clause 1 or any other clause and further comprising the step of rinsing said recyclable materials fraction with water after step of sorting said recyclable materials fraction in said waste handling system.

8. The method as described in clause 7 or any other clause wherein said step of rinsing said recyclable materials fraction with water after step of sorting said recyclable materials fraction in said waste handling system comprises the step of using said recycled water from said thermochemical conversion reactor.

9. The method as described in clause 1 or any other clause wherein said step of sorting said recyclable materials fraction in said waste handling system comprises the step of density separation sorting said recyclable materials fraction in said waste handling system.

10. The method as described in clause 1 or any other clause and further comprising the step of dewatering said recyclable materials fraction.

11. The method as described in clause 4 or any other clause and further comprising the step of fueling an existing power plant with said hydrochar from said waste handling system.

12. The method as described in clause 1 or any other clause and further comprising the step of limiting volatile organic and carbon dioxide emissions from said waste handling system.

13. The method as described in clause 1 or any other clause and further comprising the step of introducing leachate water or garbage water into said thermochemical conversion reactor of said waste handling system.

14. The method as described in clause 13 or any other clause and further comprising the step of treating and sterilizing said leachate water or said garbage water in said thermochemical conversion reactor.

15. The method as described in clause 14 or any other clause and further comprising the step of providing small organic acids and usable irrigation water from said step of treating said leachate water or said garbage water in said thermochemical conversion reactor.

16. The method as described in clause 13 or any other clause wherein said leachate water or said garbage water is introduced in said thermochemical conversion reactor with said shredded non-sorted solid waste.

17. The method as described in clause 1 or any other clause and further comprising the step of removing chlorine from chlorine containing plastics in said shredded non-sorted solid waste.

18. The method as described in clause 1 or any other clause wherein said non-sorted solid waste comprises materials chosen from plastics, polyvinyl chloride, chloride containing plastics, non-recyclable organic wastes, food waste, paper, wet organic waste, and any combination thereof.

19. The method as described in clause 1 or any other clause wherein said recyclable materials fraction comprises a non-converted recyclable materials fraction.

20. The method as described in clause 1 or any other clause wherein said thermochemical conversion reactor comprises a hydrothermal carbonization reactor.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Neither the description nor the terminology is intended to limit the scope of the claims that will be included in any subsequent patent application.

As can be easily understood from the foregoing, the basic concepts of the present invention may be embodied in a variety of ways. It involves both managing waste techniques as well as devices to accomplish the appropriate waste techniques. In this application, the managing waste techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "reactor" should be understood to encompass disclosure of the act of "reacting"—whether explicitly discussed or not—and, conversely, were there effectively disclosure of the act of "reacting", such a disclosure should be understood to encompass disclosure of a "reactor" and even a "means for reacting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. US PATENTS

| | | | |
|---|---|---|---|
| 10,392,566 | B2 | 2019 Aug. 27 | Linck et al. |

II. US PATENT APPLICATION PUBLICATIONS

| | | | |
|---|---|---|---|
| 20130295628 | A1 | 2013 Nov. 7 | Retsina et al. |

III. NON PATENT LITERATURE DOCUMENTS

Iniguez, et al., Hydrothermal carbonization (HTC) of marine plastic debris. Fuel 257 (2019) 116033. https://doi.org/10.1016/j.fuel.2019.116033 15 Aug. 2019. 8 pages.

-continued

Vlaskin, M.S., Hydrothermal carbonization of organic components from municipal solid waste. Theoretical Foundations of Chemical Engineering, 2018, Vol. 52, No. 6, pp. 996-1003. © Pleiades Publishing, Ltd., 2018.
Shen, Yafei, A review on hydrothermal carbonization of biomass and plastic
wastes to energy products. Biomass and Bioenergy, Volume 134, March 2020, 105479. 2 pages.
U.S. Provisional Patent Application No. 62/897,739, filed Sep. 9, 2019. First Named Inventor: TENG, Wai Mun.

Thus, the applicant(s) should be understood to have support to claim and make a statement of invention to at least: i) each of the managing waste devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for managing waste comprising the steps of:
   providing non-sorted, non-shredded solid waste comprising organic material and non-organic material;

introducing said non-sorted, non-shredded solid waste comprising organic material and non-organic material into a waste handling system;

processing said non-sorted solid waste said waste handling system;

shredding said non-sorted solid waste to create shredded non-sorted solid waste in said waste handling system;

introducing said shredded non-sorted solid waste into a thermochemical conversion reactor of said waste handling system;

heating and chemically converting said shredded non-sorted solid waste in said thermochemical conversion reactor;

producing hydrochar and a recyclable materials fraction from said step of heating and chemically converting of said shredded non-sorted solid waste in said thermochemical conversion reactor;

recycling water used in said heating and chemically processing of said shredded non-sorted solid waste in said thermochemical conversion reactor in said waste handling system;

sorting said recyclable materials fraction in said waste handling system;

fueling said thermochemical conversion reactor with said hydrochar in said waste handling system; and recycling heat from said thermochemical conversion reactor in said waste handling system, wherein said recyclable materials fraction comprises materials chosen from plastic, glass, metal, non-organics, sand, and solid carbon product.

2. The method as described in claim 1 wherein said non-sorted solid waste comprises non-sorted solid waste from a landfill.

3. The method as described in claim 1 wherein said non-sorted solid waste comprises domestic garbage and municipal solid waste.

4. The method as described in claim 1 wherein said step of sorting said recyclable materials fraction in said waste handling system comprises the step of sorting a plastic fraction, a glass fraction, a metal fraction, a non-organics fraction, a sand fraction, and a solid carbon product fraction from said recyclable materials fraction.

5. The method as described in claim 4 wherein said metal fraction is sorted with a sorter chosen from magnets, eddy current separation, magnetic separation, and paramagnetic separation.

6. The method as described in claim 4 and further comprising the step of fueling an existing power plant with said hydrochar from said waste handling system.

7. The method as described in claim 1 and further comprising the step of converting plastics in said thermochemical conversion reactor.

8. The method as described in claim 1 and further comprising the step of rinsing said recyclable materials fraction with water after step of sorting said recyclable materials fraction in said waste handling system.

9. The method as described in claim 8 wherein said step of rinsing said recyclable materials fraction with water after step of sorting said recyclable materials fraction in said waste handling system comprises the step of using said recycled water from said thermochemical conversion reactor.

10. The method as described in claim 1 wherein said step of sorting said recyclable materials fraction in said waste handling system comprises the step of density separation sorting said recyclable materials fraction in said waste handling system.

11. The method as described in claim 1 and further comprising the step of dewatering said recyclable materials fraction.

12. The method as described in claim 1 and further comprising the step of limiting volatile organic and carbon dioxide emissions from said waste handling system.

13. The method as described in claim 1 and further comprising the step of introducing leachate water or garbage water into said thermochemical conversion reactor of said waste handling system.

14. The method as described in claim 13 wherein said leachate water or said garbage water is introduced in said thermochemical conversion reactor with said shredded non-sorted solid waste.

15. The method as described in claim 13 and further comprising the step of treating and sterilizing said leachate water or said garbage water in said thermochemical conversion reactor.

16. The method as described in claim 15 and further comprising the step of providing small organic acids and usable irrigation water from said step of treating said leachate water or said garbage water in said thermochemical conversion reactor.

17. The method as described in claim 1 and further comprising the step of removing chlorine from chlorine containing plastics in said shredded non-sorted solid waste.

18. The method as described in claim 1 wherein said non-sorted solid waste comprises some materials chosen from plastics, polyvinyl chloride, chloride containing plastics, non-recyclable organic wastes, food waste, paper, wet organic waste, and any combination thereof.

19. The method as described in claim 1 wherein said recyclable materials fraction comprises a non-converted recyclable materials fraction.

20. The method as described in claim 1 wherein said thermochemical conversion reactor comprises a hydrothermal carbonization reactor.

* * * * *